United States Patent [19]
Phillips, Jr. et al.

[11] 3,892,141
[45] July 1, 1975

[54] LANDING GEAR WITH SHAFT DETENT CLIP RETAINER

[75] Inventors: Charles Edward Phillips, Jr., Mason; Thomas Robert Wells, Cincinnati, both of Ohio

[73] Assignee: Dayton-Walther Corporation, Dayton, Ohio

[22] Filed: Nov. 19, 1973

[21] Appl. No.: 417,119

[52] U.S. Cl. ............ 74/475; 74/342; 74/578; 403/107
[51] Int. Cl. ............ G05g 9/12; F16h 3/30
[58] Field of Search ............ 74/475, 527, 528, 342, 74/344; 403/104, 106, 107, 109, 376, 377

[56] References Cited
UNITED STATES PATENTS

| | | | |
|---|---|---|---|
| 1,813,286 | 7/1931 | Gewalt | 74/527 |
| 2,684,142 | 7/1954 | Willyard et al. | 74/527 X |
| 3,053,103 | 9/1962 | McAninich et al. | 74/527 X |
| 3,105,675 | 10/1963 | Blackburn | 74/342 X |
| 3,269,212 | 8/1966 | Voland | 74/527 X |

Primary Examiner—Samuel Scott
Assistant Examiner—John Rees
Attorney, Agent, or Firm—Biebel, French & Bugg

[57] ABSTRACT

A geared two-speed landing gear mechanism for semi-trailers is disclosed, of the type in which a hand-crank shaft is movable axially to select two gear ratios. A detent mechanism for defining the shaft position includes an elongated C-shaped spring clip which selectively engages one of a pair of grooves on the shaft. A clip retainer is formed on one wall of the gear casing and includes a pair of bent-wire retainers which are stud-welded to the wall at opposite sides of the shaft opening defining an access space therebetween for the insertion or the removal of a shaft-supporting bearing. The retainers have laterally turned ends which engage the clip to restrain it against axial movement. The retainers also support the clip in an aligned condition for ease in the insertion or removal of the shaft.

4 Claims, 9 Drawing Figures

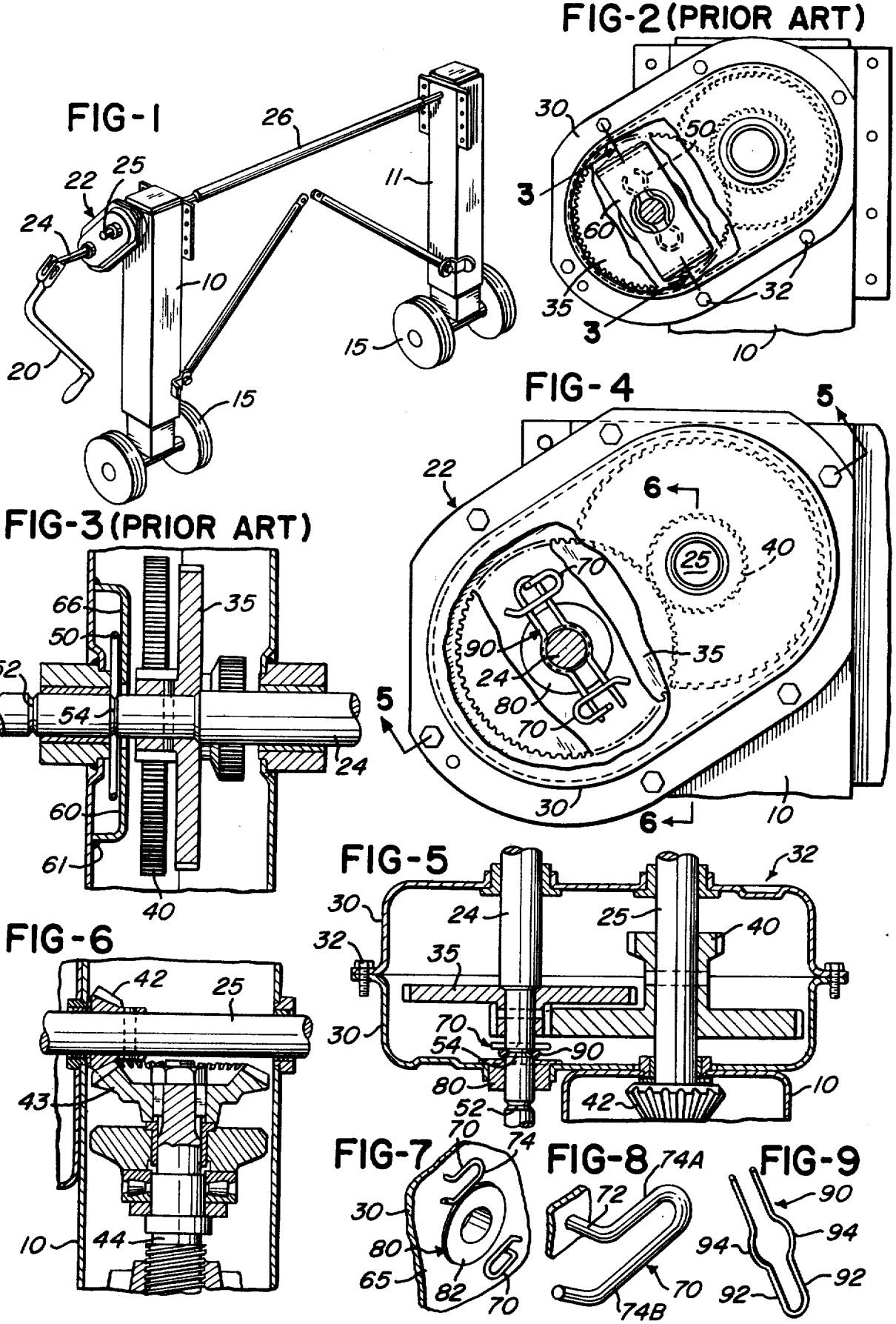

LANDING GEAR WITH SHAFT DETENT CLIP RETAINER

BACKGROUND OF THE INVENTION

This invention is directed to speed reduction crank mechanisms for semi-trailer landing gears. Such landing gears are commonly provided with means for selecting low and high gear ratios so that the landing gears can quickly be lowered into engagement with the ground and thereafter a low gear ratio may be selected by which the semi-trailer may be lifted and supported on its landing gears.

Such gear meachanisms are commonly operated by a hand-crank. The gear ratios are selected simply by pushing in or pulling out on the crank shaft. Detents are commonly provided to define the shaft position. In one instance, spring loaded balls have been used to engage grooves in the shaft. In another instance, a spring clip has been used which has a central portion selectively engageable with the grooves, in combination with a generally U or channel shaped bracket or retainer welded to one wall of the gear case and defining a clearance space within which the clip may be received.

A problem with the use of the channel shaped retainer was that it was difficult to maintain an accurate alignment or position for the detent spring. When the channel ends were welded to the wall of the gear case, the center section would have a tendency to bend or buckle. Accordingly, it was difficult to hold an accurate access space for retaining the clip.

A further problem was that the central portion of the channel bridged the opening in the wall of the gear casing through which the shaft extended, and thus created a problem with respect to the positioning and securing of a sleeve bearing in the wall for supporting the gear shaft. Also, in the event it was desired to replace the bearing, the clip support was in the way.

A further problem was that the U-shaped channel did not provide any means by which the clip would be aligned or supported while inserting the shaft, and it was thus necessary to hold the clip in position behind the retainer while inserting the shaft. Also, if the shaft were removed in performing maintenance, the detent clip was free to fall into the casing.

SUMMARY OF THE INVENTION

The present invention is directed to a geared speed reduction crank mechanism, as outlined above, incorporating an improved arrangement for supporting a detent spring clip on one wall of the gear case. The improved structure includes a pair of clip retainers. The retainers are formed of wire or rod-like material and have a leg which is stud-welded to one wall of the case. In this manner they are accurately positioned in depth relative to the wall.

The retainers are positioned at opposite sides of the shaft opening in the wall and form therebetween a clearance space for the insertion and removal of a shaft-supporting bearing. This permits the use of a flange-type bearing. Flanged bearings are preferred since they provide greater support for the shaft, when used with a thin-walled case, as compared to a sleeve bearing welded to the casing wall.

The retainers are formed with a laterally turned portion in overlying spaced relation to the wall for supporting a detent clip and for defining the axial position of the clip in relation to the shaft. The detent clip is formed with parallel spaced legs which are supported on the clip retainers, so that the detent clip is held in approximate alignment with the opening and is supported even when the shaft is withdrawn.

It is an object of this invention to provide an improved clip retainer assembly in a two-speed landing gear mechanism.

Another object is the provision of an arrangement for retaining a detent clip in a two-speed gear crank mechanism which provides for the support of the clip when the shaft is extracted, and permits access for removal and insertion of the crank shaft bearing.

These and other objects and advantages of the invention will be apparent from the following description, the accompanying drawings and the appended claims.

BRIEF DESCRIPTION OF THE DRAWINGS

FIG. 1 is a perspective view of a landing gear to which this invention is applied;

FIG. 2 is a partially broken away elevation of the gear case showing a prior art arrangement for retaining a detent clip;

FIG. 3 is an enlarged section through the prior art arrangement taken generally along the line 3—3 of FIG. 2;

FIG. 4 is a partially broken away elevation of the gear case to which the present invention has been applied, showing the improved clip and clip retainer;

FIG. 5 is a section through the gear case of FIG. 4 taken generally along the line 5—5;

FIG. 6 is a fragmentary section taken generally along the line 6—6 of FIG. 4;

FIG. 7 is a perspective detail of the flange bearings and the clip retainers;

FIG. 8 is a fragmentary enlarged perspective of one of the retainers; and

FIG. 9 is a view of the improved retainer clip.

DESCRIPTION OF ENVIRONMENT AND PRIOR ART

The invention pertains to landing gears for semi-trailers and the like, and a typical landing gear to which the invention is applied is shown in FIG. 1 as including a pair of legs, the upper ends of which are mounted on the frame of a semi-trailer. The lower ground-engaging wheels 15 are raised and lowered by a lead screw mechanism within the legs 10 and 11. The raising and the lowering movement is caused by a hand-crank 20 through a gear reduction unit 22 associated with the leg 10. The gear reduction unit 22 includes an input shaft 24 on which the hand crank 20 is mounted, and includes an output shaft 25. The output shaft is connected transversely of the legs 10 and 11 by means of a connecting shaft 26.

The gear mechanism 22 commonly provides for the selection between high and low gear ratios, such as selection between the ratios 26:1 on the one hand and 2.6:1 on the other hand. The gear ratios are selected by axial movement of the input shaft 24. As shown in FIGS. 2 and 3, the mechanism 22 includes a split gear case 30, the halves of which are connected together by bolts 32. The input shaft 24 supports a drive gear 35 which is formed with two diameters of drive teeth, the same being selectively engageable with corresponding sets of teeth on an output gear 40 on the shaft 25, by axial movement of the shaft 24. As shown in FIGS. 5 and 6, the output shaft 25 drives a right angle bevel gear 42 and a mating bevel gear 43 mounted on the lead screw 44 within the leg 10, in a conventional manner.

A hairpin-shaped wire clip 50 has been used in the prior art for selective engagement with one of a pair of V-shaped grooves 52 and 54 on the shaft 24, to define the positions of the drive gear 35. A generally U or channel-shaped clip retainer 60 has been welded at 61 to the adjacent wall 65 of the gear case 30 to prevent axial movement of the clip 50, while permitting the clip to rotate freely thereunder. As described above under the "Background" section of this specification, the retainer 60 has been proven to have certain drawbacks and deficiencies. It does not provide accurate positioning of the clip 50 due to the tendency of the elongated central section 66 to buckle or warp during welding. Further, the retainer 60 was in overlying relation to the shaft support bearing and bearing housing, thus making difficult the insertion and replacement of the bearing. Further, the retainer 60 had no provision for supporting the clip 50 in alignment with the shaft opening.

DESCRIPTION OF PREFERRED EMBODIMENT

The preferred embodiment is illustrated in FIGS. 4,5, and 7–9 in which the same reference numerals in common with those previously described are used. An improved retainer means includes a pair of formed rod-like or wire clip retainers 70. The retainers 70 each having an axially extending leg portion 72 as shown in FIG. 8 which is stud-welded to the inside surface of the wall 65, thus providing for accurate positioning of the retainer. The retainers are positioned in a pair, diametrically opposite the bearing opening formed in the wall 65. Each retainer terminates in a laterally turned retainer portion 74 which is positioned in overlying spaced relation to the wall 65, the space being that of the length of the leg portion 72. The portion 74 is thus shown as extending first in one direction transverse to the axis of the shaft 24 and then curved and brought back in the form of an open loop, in which the two sides (74A and 74B) of the loop are equally spaced from the wall 65 and are substantially parallel to each other.

As shown in FIG. 7, the retainers 70 are spaced to provide access for a flanged bearing 80. The bearing 80 has a support flange 82 in overlying relation to the inside surface of the wall 65 and may be adhesively applied to the wall and wall opening.

Detent means includes an improved elongated generally C-shaped clip 90. Clip 90 is also formed of rod-like material with a pair of parallel spaced legs 92 and a semi-circular shaft receiving portion 94 formed midway in the legs. The clip 90 is supported on the retainers 70, and at the same time, is restrained by the retainers against axial movement.

The legs 92 are received on the opposite sides of the axial leg portions 72 of the retainers 70, as shown in FIG. 4. Thus, the clip 90 is retained in approximate aligned position with respect to the shaft opening in the bearing 80 when the shaft 24 is withdrawn. During assembly, it is thus a simple matter to slip the clip 90 over the legs 72 as shown in FIG. 4 and then insert the shaft 24. In the event it becomes necessary to perform maintenance on the gear mechanism 22, the shaft 24 may be withdrawn without the clip falling free into the gear case.

The stud-welding process permits the retainer portions to be accurately spaced with respect to the wall 65, and to the exposed surface of the bearing flange 82. The detent clip 90 is thus located between the flange 82 and the portions 74. The open space defined between the retainers 70 permits access to the bearing 80 for its insertion or removal as required. The encircling portions 94 are biased to selectively enage with the V-shaped recesses 52. Axial repositioning of the shaft 24 is accompanied by a spreading movement of the clip 90. The use of the stud-welded retainers 70 also results in a cost savings in manufacture. These retainers are easily formed and attached at the correct location and height, and there is less likelihood of a deformed retainer resulting in a scrapped part as compared to the prior art construction of FIGS. 2 and 3.

While the form of apparatus herein described constitutes a preferred embodiment of the invention, it is to be understood that the invention is not limited to this precise form of apparatus, and that changes may be made therein without departing from the scope of the invention.

What is claimed is:

1. In a geared speed reduction crank mechanism for a semi-trailer landing gear, the improvement comprising a gear case having a wall, means in said wall defining a bearing opening, a bearing removably received in said opening, a hand crank shaft received in said bearing and supporting gear means thereon, said shaft being movable axially in said bearing to select different gear ratios for raising and lowering the landing gear, means in said shaft defining axially-spaced grooves corresponding to selectable axial shaft positions, a generally C-shaped elongated detent spring clip on said shaft having a pair of parallel legs with opposite ends overlying said wall and a central portion thereof selectably engageable with said grooves, and a pair of clip retainers on said wall positioned on diametric opposite sides of said opening and defining therebetween a space for access to insert and remove said bearing, said retainers each having a leg portion extended axially of the shaft in the space between said clip legs and terminating in a laterally turned retainer portion overlying said wall in spaced relation thereto defining with said wall a clip-receiving space, said retainer portions being positioned to engage said clip adjacent the opposite ends thereof and restrain it against axial movement while permitting unrestricted opening and closing movement of the legs thereof with said shaft movement.

2. The mechanism of claim 1 in which said retainer leg portions are positioned diametrically opposite said opening, and said clip legs are received on opposite sides of said leg portions with said central portion thereof partially encircling said shaft, said clip being loosely supported on said retainers when said shaft is withdrawn.

3. In a geared speed reduction crank mechanism for a semi-trailer landing gear, the improvement comprising a gear case having a wall, means in said wall defining a bearing opening, a flanged bearing removably received in said opening and having a flange received on the inside surface of said wall, a hand crank shaft received in said bearing, gear means on said shaft, said shaft being axially movable to select different gear ratios for raising and lowering the landing gear, means in said shaft defining axially-spaced grooves corresponding to selectable axial shaft positions, a transversely elongated detent spring clip on said shaft having opposite legs adjacent said bearing flange, said legs being formed with a central semi-curved portion selectably engageable in said grooves with a spreading and a closing movement of said legs, and a pair of clip retainers on said wall positioned on diametric opposite sides of said flange and defining therebetween a space for access to insert and remove said bearing, said retainers each having a leg portion extending axially of said shaft in the space between said clip legs and terminating in a laterally turned retainer portion overlying said wall in spaced relation thereto and axially inwardly of said bearing flange, said retainer portions being proportioned to engage said clip legs adjacent the opposite ends thereof and restrain said clip against axial movement while permitting said groove-engaging leg movement.

4. In a geared speed reduction crank mechanism for a semi-trailer landing gear, the improvement comprising a gear case having a wall, means in said wall defining a bearing opening, a bearing in said opening, a shaft received in said bearing and supporting gear means thereon, said shaft being movable axially in said bearing to select different gear ratios for raising and lowering the landing gear, means in said shaft defining a pair of axially-spaced grooves corresponding to selectable axial shaft positions, a generally C-shaped elongated detent spring clip on said shaft having opposite ends overlying said wall and a central portion selectably engageable with said grooves, and a pair of clip retainers on said wall formed of rod-like material and positioned on opposite sides of said bearing, said retainers each having an axially extending leg portion which is stud-welded to said wall and terminating in a laterally-turned retainer portion overlying said wall defining a clip-receiving space, said retainer portions being positioned to engage said clip adjacent the opposite ends thereof and restrain it against axial movement while permitting opening and closing movement thereof with said shaft movement.

* * * * *